United States Patent Office 3,679,631
Patented July 25, 1972

3,679,631
HIGHER HEAT SET SPANDEX PREPARED FROM A MIXTURE OF A POLYETHER OR POLYESTER PREPOLYMER AND A DIHYDRIC PHENOL AND METHOD OF PREPARATION
Nathan Mayes, Barrington, R.I., assignor to Globe Manufacturing Company, Fall River, Mass.
No Drawing. Filed Feb. 8, 1971, Ser. No. 113,609
Int. Cl. C08g 22/10, 22/14
U.S. Cl. 260—47 CB                                16 Claims

ABSTRACT OF THE DISCLOSURE

The heat setting of cross-linked spandex can be increased by adding a dihydric phenol, preferably bisphenol A, to the preformed polyester or polyether prior to reaction with the organic polyisocyanate and subsequently curing, e.g., with a polyamine. The use of the dihydric phenol also permits faster curing of the spandex at lower temperature.

Art considered in filing this application

Cahill—3,387,071, June 4, 1968; Britain—3,422,066, Jan. 14, 1969; and Mahomed (British)—1,185,151, Mar. 25, 1970.

The present invention relates to the preparation of spandex, i.e., polyurethane fibers.

Fabrics that contain elastic thread are likely to be distorted during manufacture as the result of differences in tension in the individual elastic ends. To remove distortions these fabrics must be heated in a stretched condition to block them. The blocking can occur only if, and to the extent that, the elastic fiber undergoes heat setting or does not shrink to its original length after being heated while stretched. Blocking is necessary to shape the fabric and give it a smooth appearance; however, there is also an economic advantage in permanently stretching the fabric since this yields a greater yardage of fabric. Thereforce, high heat set is a desirable property of elastic textile fibers.

Spandex fibers presently produced are of two types, uncrosslinked and crosslinked. Crosslinking is desirable in that it permits lower stress decay and set characteristics, but undesirable in that it lowers heat set. By means of the present invention the heat set of a crosslinked spandex may be increased without sacrificing the advantages of crosslinking.

It is an object of the present invention to increase the heat set of crosslinked spandex fibers.

Another object is to provide faster curing of the spandex at lower temperatures.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that these objects can be attained by adding a dihydric phenol to a polyester or polyether having terminal hydroxyl groups and having a functionality of 2.0 or above and also adding a polyisocyanate and subsequently extruding into a bath containing a polyamine, usually a primary or secondary aliphatic or heterocyclic amine to form a filament followed by curing.

With the exception of the addition of the dihydric phenol the process is conventional and is taught in Cahill Pat.

3,387,071, the entire disclosure of which is hereby incorporated by reference.

As dihydric phenols there can be used bisphenol A (4,4'-isopropylidene diphenol), hydroquinone, resorcinol, tetrachlorobisphenol A, 4,4'-dihydroxybenzophenone, 1,1-bis-(4-hydroxyphenyl)-cyclohexane, 2,2 - bis-(4-hydroxyphenyl)-butane, 4,4'-dihydroxydiphenyl ether, 4,4'-dihydroxydiphenyl sulfone, 4,4'-dihydroxydiphenyl sulfide, and bis-(4-hydroxyphenyl)-methane. The bisphenols are preferred, bisphenol A being especially preferred.

Thermal reversability of the reaction of isocyanates and phenols is known.

The urethane product of an aromatic isocyanate and phenol decomposes to the starting materials at about 120° C. The urethane product of aromatic isocyanate and aliphatic alcohol decomposes above 200° C. Thus the crosslinks of spandex of the phenol urethane type decompose to phenol and isocyanate when heated above 120° C., but these recombine at lower temperatures to reform crosslinks. The reversible reaction is illustrated by the equation below:

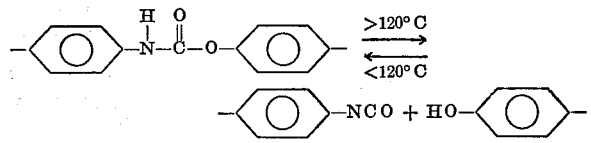

If the spandex is not heated above 200° C. other linkages are not affected during short heating periods and the total effect on the spandex, when it is heated and then cooled in a stretched condition, is rupture, reformation and relocation of crosslinks. The reformation of crosslinks in the stretched condition prevents the elastic return of the spandex and results in the heat set. Since there is no net loss of linkages there is no loss of tensile strength or increase in stress decay. There is a re-orientation of polymer molecules during stretching which is frozen into the spandex by linkage reformation. This results in lower elongation, higher modulus and higher tensile strength, much as is observed to result from ordinary fiber drawing.

In carrying out the present invention the molar ratio of polyester or polyether hydroxyl to phenol hydroxyl can vary from 0.5:1 to 50:1. The molar ratio of isocyanate group to total hydroxyl groups normally is in the range of 1.2:1 to 4.0:1.

As previously pointed out the novel spandex fibers formed by the present invention have increased heat set. Also, the starting prepolymers can be spun to fibers and cured to desirable physical properties at lower cure temperatures and times than such compounds without the dihydric phenols. The significance of this discovery is that production costs can be lowered by (1), use of less energy to cure to desirable levels and (2), lower residence time at elevated temperatures which permits higher production rates.

The liquid prepolymer from the polyester or polyether, dihydric phenol and polyisocyanate is extruded into a bath containing a polyamine, usually together with an organic solvent. The polyamine can be as high as 10 normal, but is usually between 0.05 and 1.5 normal if the solvent is a hydrocarbon.

As suitable amines there can be used ethylene diamine, propylene diamine, trimethylene diamine, hexamethylene diamine, diethylene triamine, triethylene tetramine, tetraethylene pentamine, 1,4 - diamino-cyclohexane, 3,3'-diamino-dipropyl ether, diamino dibutyl sulfide, m-xylylene diamine, piperazine, N-aminoethyl piperazine, N,N'-dimethyl ethylene diamine, 2-methyl piperazine, bis tallow amines made by reducing the diamides of dimerized unsaturated fatty acids, e.g., the diamine of dimerized linseed oil fatty acids.

As the organic solvents there can be used ethylene glycol, 1,4-butanediol, 1,3-butylene glycol, propylene glycol, glycerine, hexanetriol, methyl alcohol, ethyl alcohol, isopropyl alcohol, butyl alcohol, amyl alcohol, acetonitrile, propionitrile, dimethyl formamide, diethyl formamide, dimethyl acetamide, aromatic hydrocarbons, e.g., benzene, toluene, o-xylene, p-xylene, m-xylene, mixed xylenes, ethyl benzene, 1,3,5-trimethyl benzene, propyl benzene, isopropyl benzene and butyl benzene, and aromatic naphtha. Any solvent blend can be used as long as the polyamine is miscible and the concentration is adjusted to yield the desired amount of available amine. Aliphatic hydrocarbons, e.g., hexane, pentane, heptane, octane, kerosene, mineral oils, VM and P naphtha, cyclohexane can be used in combination with other solvents such as alcohols or aromatic hydrocarbons.

The use of 4% of ethylene diamine in toluene is approximately equivalent to the use of 20% of ethylene diamine in isopropanol.

The urethane prepolymers are formed by reacting an excess of polyisocyanate with the polyol, i.e., the mixture of polyester or polyether with the dihydric phenol.

The isocyanates can be aromatic or aliphatic. The polyol can include (1) a polyester from either dicarboxylic acids and glycols or by ring openings of lactones, (2) polyethers, (3) polyester-ethers, (4) castor oil products or (5) any other material containing two or more alcoholic hydroxyl groups and a hydroxyl number between 20 and 225. In order to lower the viscosity and aid in the spinning of the prepolymer a small amount of a conventional polyurethane solvent, e.g., 1 to 20%, preferably 5%, can be added prior to spinning. Typical solvents include ketones, such as acetone, methyl ethyl ketone, and methyl isobutyl ketone, substituted amides, e.g., dimethyl formamide and dimethyl acetamide, carbonates, e.g., ethylene carbonate and propylene carbonate, sulfoxides, e.g., dimethyl sulfoxide, aromatic hydrocarbons, and esters.

As polymeric materials having terminal alcoholic hydroxyl groups suitable for making prepolymers with organic polyisocyanates there can be used chain extended polyesters made from a glycol, preferably a mixture of ethylene and propylene glycols, and a saturated organic dicarboxylic acid, preferably, adipic acid. Usually, the glycol contains 2 to 20 carbon atoms. Typical examples of such glycols include ethylene glycol, propylene glycol, trimethylene glycol, 1,4-butylene glycol, 1,6-hexanediol, 1,4-butenediol, neopentyl glycol, diethylene glycol, thiodiglycol, etc. The acid usually contains 4 to 20 carbon atoms. Typical examples include succinic acid, maleic acid, dihydromuconic acid, thiodipropionic acid, adipic acid, methyl adipic acid, glutaric acid, dimerized linoleic acid, sebacic acid, suberic acid, phthalic acid, and terephthalic acid. Hydroxycarboxylic acids or their lactones can be used, e.g., epsilon caprolactone, in forming the polyesters. As stated, mixtures of various dibasic acids and glycols can be used to form mixed esters.

An excess of the glycol over the acid is used in preparing the polyesters so that the resulting polyester contains terminal hydroxyl groups. Usually such an amount of glycol is used as to give a polyester having a hydroxyl number of 20 to 225 and preferably 30 to 75, and a low acid value, e.g., less than 6 and preferably less than 1. The molecular weight of the polyester usually ranges from 500 to 5,000 and preferably 1,500 to 4,000. In general, the most suitable polyesters having melting point levels of 90° C. or lower and preferably not over 60° C. Less suitably, natural polyesters can be used, e.g., castor oil, as well as blown drying oils, such as blow tung oil, linseed oil and soya oil.

Some functional branching helps. If this is not present in the polyester it is introduced through allophanate formation. Only a small amount is needed, i.e., a functionality above 2.1 but usually not over 2.5.

Other examples of suitable polyesters for use in preparing the propolymer are polyethylene adipate, polyethylene adipate-phthalate and polyneopentyl sebacate. Small amounts of trialcohols such as trimethylolpropane or trimethylolethane may be included in preparing the glycoldicarboxylic acid polyesters and such modified forms of polyester are included within the term of polyester as used herein.

As an alternative to the polyesters there may be used for reaction with the polyisocyanate one or more elastomer-yielding polyethers. Such polyethers are typically anhydrous chain extended polyethers possessing ether linkage separated by hydrocarbon chains either alkyl or aryl in nature. The ether should also contain terminal groups reactive to isocyanate, such as alcoholic hydroxyl groups. Such polyethers may be linear or branched. Usually, the polyethers are chiefly linear with a melting point of not over 90° C., preferably not over 60° C. The molecular weight may range from 500 to 5,000, hydroxyl number of 225 to 22, but preferably is within the range of 750 to 3,500 (hydroxyl number of 150 to 32). Preferred polyethers have the formula $H(OR)_nOH$ where R is a lower alkylene group (2 to 6 carbon atoms) and $n$ is an integer so that the molecular weight falls within the range specified. Examples of polyethers are polyethylene glycol, polypropylene glycol, mixed polyethylene glycol-polypropylene glycol, polytetramethylene glycol (e.g., of 1,000 molecular weight).

Polyethers not only can be used in place of the polyesters but can be used in conjunction therewith. Examples of such compounds are polydiethylene glycol adipate and polytriethylene glycol adipate. Further examples of polyesters and polyethers which are suitable are set forth in Kohrn Pat. No. 2,953,839 and the patents cited therein in column 2, lines 56–68.

The polyester or polyether (including polyether-ester) and phenol is reacted or "capped" with a diisocyanate using a considerable molar excess, commonly from a 20 to a 250%, and preferably from a 50 to a 200%, molar excess of the amount of diisocyanate required to react with all of the alcoholic hydroxy groups furnished by the polyester or polyether. The reaction is frequently effected by mixing the polyester or polyether and phenol with the diisocyanate either at room temperature or at a moderately elevated temperature, e.g., 70 to 150° C. to form an uncured liquid prepolymer which is soluble in methyl ethyl ketone. The prepolymer is essentially a linear polyurethane having terminal isocyanate groups. The reaction is preferably carried out at 90 to 100° C.

Representative of the preferred aromatic diisocyanates that may be mentioned by way of nonlimiting examples are m- and p-phenylene diisocyanate, tolylene diisocyanate (65% 2,4 and 35% 2,6 or 80% 2,4 and 20% 2,6 and 100% 2,4), p,p'-diphenyl diisocyanate, 1,5-naphthalene diisocyanate, p,p'-diphenyl-methane diisocyanate, 3,3'-bi-tolylene-4,4'-diisocyanate, 2,4-tolylene diisocyanate dimer, dianisidine diisocyanate, 4-chloro-1,3-phenylene diisocyanate. Aliphatic and cycloaliphatic diisocyanates can also be used such as 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronaphthalene diisocyanate. Other diisocyanates can be employed including those set forth in Kohrn Pat. No. 2,953,839, as well as those mentioned in the patents set forth in Kohrn. There can be included triisocyanates or higher isocyanates in order to get added functionality in the coagulating bath. Such isocyanates include PAPI (phenylmethylene isocyanate trimer), 2,4,4'-diphenyl ether triisocyanate, 4,4',4" - triisocyanate triphenylmethane, toluene 2,4,6-triisocyanate.

Curing can be done at 65 to 205° C. for a time as little as a few seconds up to several hours and can be as much as 30 hours. Most conveniently a temperature is selected at which a curing time of 1 minute or less, e.g., 15 seconds, can be employed.

Unless otherwise indicated all parts and percentages are by weight.

EXAMPLE 1

A prepolymer was prepared from the reaction of polyethylene-propylene adipate resin of hydroxyl number 36 and hydroxyl functionality 2.33 and bisphenol-A with toluene diisocyanate (80:20 2.4:2.6 TDI). The formulation was 0.514 equivalent of resin hydroxyl, 0.147 equivalent of bisphenol-A hydroxyl and 1.15 equivalents of isocyanates. The prepolymer was extruded into a bath of 3% ethylene diamine in toluene and drawn to a fiber of 265 denier in the manner described by Cahill, Powell and Gartner in U.S. Pat. 3,387,071. For comparison, a fiber was similarly spun from a prepolymer similarly prepared but without the bisphenol-A. Fiber properties including heat set data are shown below. The curing was carried out at 200° C. for 38 seconds.

|  | Bisphenol-A fiber | Control |
| --- | --- | --- |
| Denier | 265 | 265 |
| Tensile, g./den | 0.55 | 0.59 |
| Elongation, percent | 670 | 725 |
| Heat set, percent [1] | 225 | 190 |
| Tensile after heat set, g./den | 0.57 | 0.50 |
| Elongation after heat set, percent | 525 | 340 |

[1] Percentage increase in length after heating 3 minutes at 175° C. while stretched 300%.

As pointed out supra it has also been found that compounds containing dihydric phenols, most preferably bisphenol-A (sometimes abbreviated herein as BPA) may be spun to fibers and cured at lower temperatures and shorter times to obtain desirable physical properties than such compounds omitting the BPA or other dihydric phenol.

EXAMPLE 2

A polyurethane prepolymer was prepared by heating at 90° C. for 3 hours 100 parts (0.064 equivalent) of polyethylene-polypropylene adipate having a hydroxyl number of 36 and a functionality of 2.3, 12.5 parts (0.143 equivalent) of toluene diisocyanate (TDI of 80/20 2.4/2.6 isomer ratio) and 2.1 parts (0.018 equivalent) of BPA. Upon completion of reaction 6.25 parts of toluene were added and stirred in to produce a viscosity more suitable for spinning. The viscosity at this point was 576,000 cps. at 26° C. and analysis showed 2.32% isocyanate.

A control prepolymer was prepared by heating at 90° C. for 3 hours 100 parts of polyethylene-polypropylene adipate having a hydroxyl number of 36 and a functionality of 2.3 and 12.5 parts of TDI. The prepolymer viscosity was 550,000 cps. at 26° C. and isocyanate content was 2.65%.

The BPA prepolymer and control prepolymer were simultaneously extruded from separate spinnerettes into a bath of 3% ethylene diamine in toluene and spun as described in U.S. Pat. 3,387,071. The data presented below illustrates the fact that BPA compound yields higher physical properties, particularly tensile strength, at lower temperatures and cure times. All physical properties of BPA compound were above acceptable limits whereas the control tensile strength and sometimes elongation were below acceptable values.

|  |  | Cure | | Physical properties | |
| --- | --- | --- | --- | --- | --- |
| Prepolymer | Denier | Temp., ° C. | Time, sec. | Tensile, g./den. | Elongation, percent | Modulus [1] |
| BPA | 265 | 200 | 48 | 0.75 | 750 | 0.022 |
| Control | 265 | 200 | 48 | 0.76 | 750 | 0.024 |
| BPA | 265 | 157 | 24 | 0.74 | 800 | 0.021 |
| Control | 265 | 157 | 24 | 0.53 | 750 | 0.020 |
| BPA | 265 | 157 | 48 | 0.83 | 775 | 0.022 |
| Control | 265 | 157 | 48 | 0.57 | 750 | 0.022 |
| BPA | 265 | 140 | 48 | 0.73 | 750 | 0.021 |
| Control | 265 | 140 | 48 | 0.43 | 725 | 0.020 |
| BPA | 87 | 157 | 18 | 0.92 | 760 | 0.020 |
| Control | 87 | 157 | 18 | 0.47 | 640 | 0.020 |

[1] G./den. at 200% elongation.

EXAMPLE 3

Other bisphenol compounds were evaluated to compare effectivenes in reducing cure temperature requirements and increasing heat set. A prepolymer was prepared exactly as described above for BPA except that an equivalent quantity of the bisphenol being tested was substituted for BPA. The prepolymers were spun and cured at three temperatures for 48 seconds and physical properties and heat set measured for each of the products. The results, tabulated below indicate that all of the bisphenols tested tend to increase heat set and/or increase physical properties at lower temperatures. BPA was the most effective toward increasing both heat set and physical properties at lower temperatures.

|  | 200° C. cure | | | 182° C. cure | | | 160° C. cure | | |
| --- | --- | --- | --- | --- | --- | --- | --- | --- | --- |
| Prepolymer | Tensile, g./den. | Elongation, percent | Heat set, percent [1] | Tensile, g./den. | Elongation, percent | Heat set, percent [1] | Tensile, g./den. | Elongation, percent | Heat set, percent |
| Control | .63 | 725 | 180 | .60 | 650 | 180 | .47 | 600 | 193 |
| 4,4-dihydroxybenzophenone | .52 | 675 | 200 | .60 | 650 | 208 | .47 | 650 | 198 |
| 1,1-bis-(4-hydroxyphenyl)-cyclohexane | .68 | 750 | 168 | .72 | 900 | 210 | .62 | 625 | 185 |
| 2,2-bis-(4-hydroxyphenyl)-butane | .66 | 675 | 188 | .74 | 725 | 183 | .74 | 750 | 195 |
| Bis-(1-hydroxyphenyl)-methane | .74 | 725 | 195 | .72 | 700 | 195 | .72 | 650 | 190 |
| BPA | .74 | 725 | 200 | .72 | 725 | 200 | .78 | 725 | 206 |

[1] Increases in length after heating 3 minutes at 175° C. while stretched 300%.

The following example was carried out without employing toluene diluent in preparing the spinning compound and shows that the use of solvents is not necessary. A greater quantity of diisocyanate was employed in order to maintain a viscosity more suitable for spinning.

EXAMPLE 4

A polyurethane prepolymer was prepared by heating at 90° C. for 3 hours 100 parts of polyethylene-polypropylene adipate having a hydroxyl number of 36 and a functionality of 2.3, 15 parts of TDI and 2.1 parts of BPA. At completion of reaction the isocyanate content was 3.30% and viscosity was 656,000 cps. at 26° C. The prepolymer was spun into a bath of 3% ethylene diamine in toluene and cured in separate cases at three different temperatures for 48 seconds. The results shown below demonstrate the effects of BPA to increase heat set and physical properties at lower cure temperatures in the absence of a diluent. This is evident upon comparison with the control of Example 3.

| Cure temperature, ° C. | Tensile, g./den. | Elongation, percent | Heat set, percent [1] |
| --- | --- | --- | --- |
| 200 | .74 | 750 | 204 |
| 182 | .67 | 750 | 216 |
| 160 | .65 | 725 | 226 |

[1] Increase in length after heating 3 minutes at 175° C. while stretched 300%.

What is claimed is:

1. A process of preparing an elastic cross-linked spandex fiber of increased heat set comprising reacting a polyester or polyether prepolymer having free alcoholic hydroxyl groups with a mixture of a dihydric phenol and an organic polyisocyanate to form a liquid polyurethane having terminal isocyanate groups, preparing a fiber from said liquid polyurethane and then curing with a primary or secondary polyamine.

2. A process according to claim 1 wherein the prepolymer has a functionality of 2.0 or above, the curing agent is a primary or secondary polyamine and the ratio of prepolymer hydroxyl groups to dihydric phenol hydroxyl groups is from 0.5:1 to 50:1.

3. A product prepared according to the process of claim 2.

4. A process according to claim 2 wherein the prepolymer hydroxyl groups are in excess of the phenolic hydroxyl groups.

5. A process according to claim 4 wherein the isocyanate is an aromatic polyisocyanate.

6. A process according to claim 5 wherein the isocyanate is a diisocyanate and the dihydric phenol is selected from the group consisting of alkylidene bisphenols having 1 to 4 carbon atoms in the alkylidene group, cyclohexylidene bisphenol and bis(hydroxy phenyl) ketone.

7. A process according to claim 6 wherein the dihydric phenol is 4,4'-isopropylidene diphenol.

8. A product prepared by the process of claim 7.

9. A process according to claim 8 wherein the polyisocyanate is toluene diisocyanate.

10. A process according to claim 9 wherein the curing agent is ethylene diamine.

11. A process according to claim 6 wherein the curing is carried out at a temperature of 120 to 220° C. for a time of up to 1 minute.

12. A process according to claim 11 wherein the curing is carried out for 18 to 45 seconds at 140 to 182° C.

13. A process according to claim 12 wherein the dihydric phenol is 4,4'-isopropylidene diphenol.

14. A process according to claim 1 wherein the prepolymer has a functionality of above 2.1 but not over 2.5.

15. A process according to claim 14 wherein the isocyanate is a diisocyanate and the dihydric phenol is selected from the group consisting of alkylidene bisphenols having 1 to 4 carbon atoms in the alkylidene group, cyclohexylidene bisphenol and bis(hydroxyphenol)ketone.

16. A process according to claim 15 wherein the dihydric phenol is 4,4'-isopropylidene diphenol.

References Cited

UNITED STATES PATENTS

| | | | |
|---|---|---|---|
| 3,494,894 | 2/1970 | Urgesi | 260—75 |
| 3,387,071 | 6/1968 | Cahill et al. | 264—184 |

WILLIAM H. SHORT, Primary Examiner

L. L. LEE, Assistant Examiner

U.S. Cl. X.R.

260—18 TN, 308 DS, 32.4, 32.6 N, 32.8 N, 33.4 UR, 75 NP, 77.5 SP; 264—184